March 27, 1934.  H. D. HEUSER  1,952,252
COLLAPSIBLE TOP FOR VEHICLES
Filed May 24, 1933    4 Sheets-Sheet 4
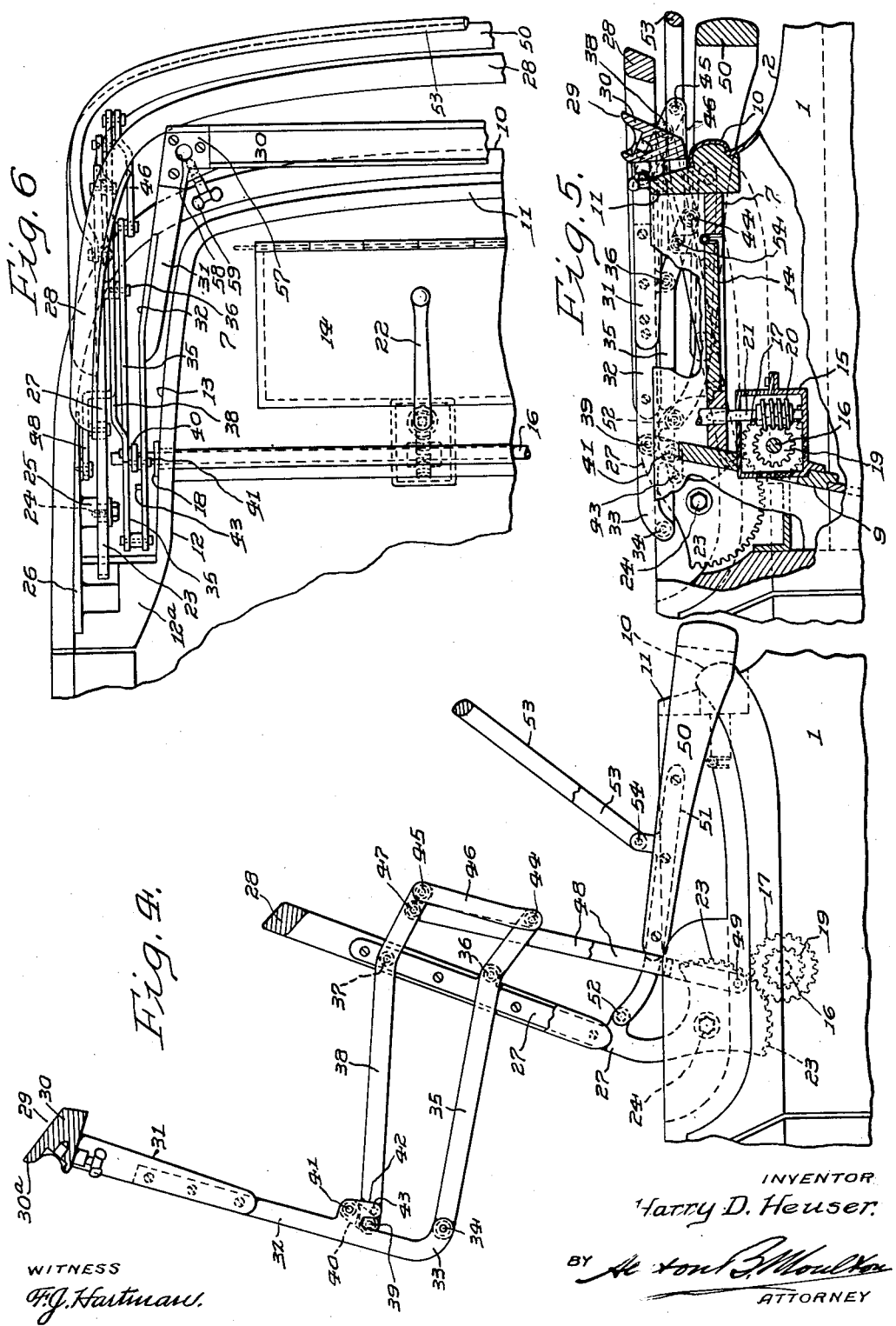
INVENTOR
Harry D. Heuser.
BY
ATTORNEY
WITNESS
F. J. Hartman.

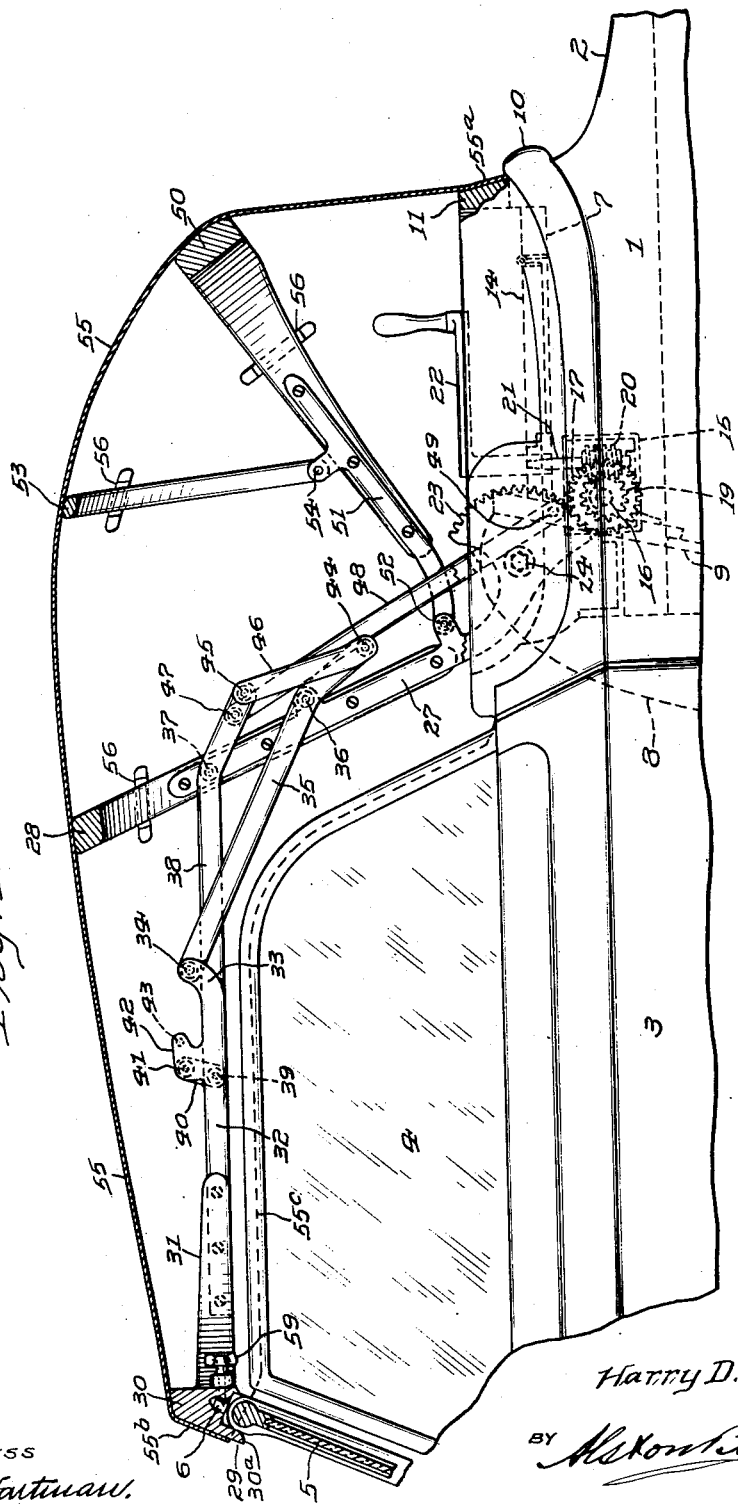

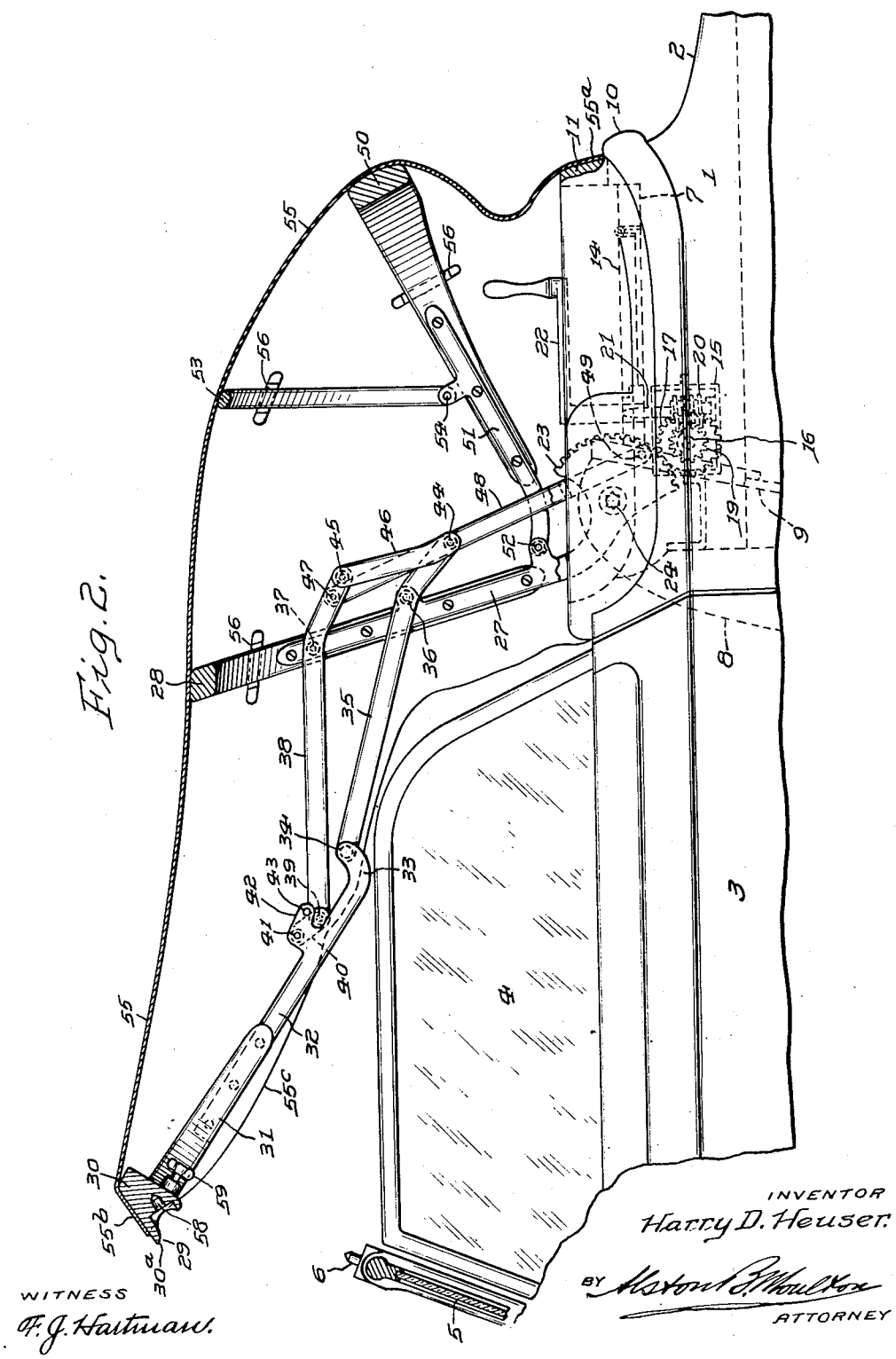

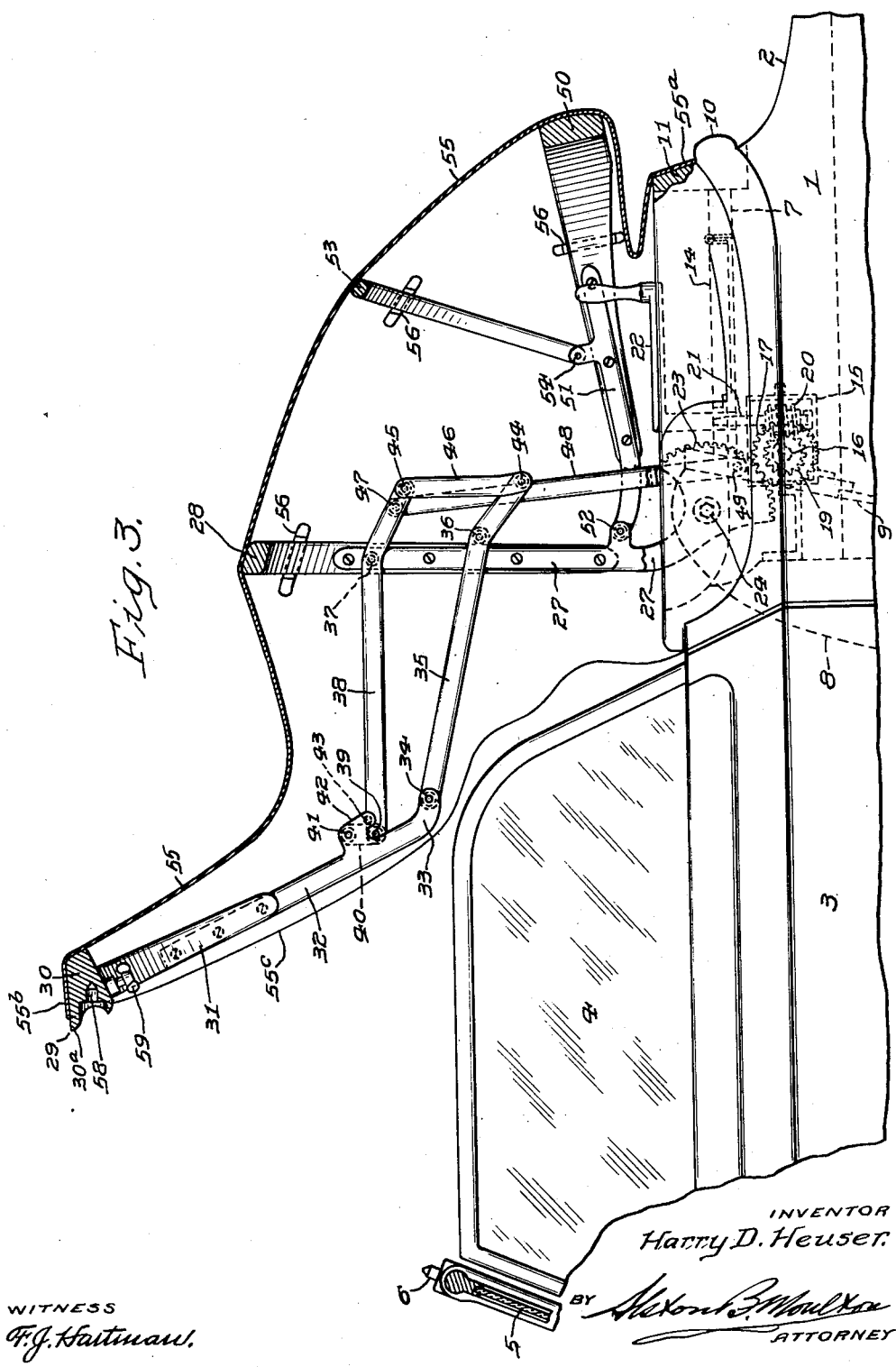

Patented Mar. 27, 1934

1,952,252

UNITED STATES PATENT OFFICE 1,952,252

COLLAPSIBLE TOP FOR VEHICLES

Harry D. Heuser, Bryn Mawr, Pa., assignor to Derham Custom Body Company, Rosemont, Pa., a corporation of Pennsylvania Application May 24, 1933, Serial No. 672,577

4 Claims. (Cl. 296—107)

The present invention relates to those light, easily operated foldable tops for automobiles which, except for the presence of a collapsible top, are open vehicles and are used in fair weather with the top in its lowered or collapsed position.

One of the objects of the present invention is to provide a collapsible top for a vehicle with a front frame, bows, links and levers so connected together that when the top is in its raised position, the swinging of the main bow rearwardly from its forward position carries with it and inverts the said front frame which, with all the spreader bows of the top, is swung into a position at the rear of the seat, in which position the bows and front frame are substantially nested in substantial parallellism over, or on, or in a pocket in the rear deck of the body of the car; and by swinging said main bow forwardly from its lowered rearmost position, the top frame is lifted and re-verted and the front frame is swung forwardly from the main bow into a position over the windshield to which the front frame may be readily attached in any convenient manner, this motion effecting the unfolding of the foldable material constituting the top proper and the placing of it under suitable tension when the top is open.

A further object of this invention is to provide means for easily raising and lowering a collapsible top of a vehicle by the manual rotation of a crank and the operation of a mechanism driven thereby, and operative to swing the main bow and the parts connected thereto about a pivotal connection to the body of the car, said crank being so accessible and so easily operable that it is unnecessary for the operator to get out of the car or to leave the seat in order to swing the top to open or to closed position.

A further object of this invention is to provide a vehicle top with a pair of main operating levers pivoted to the opposite sides of the car and preferably at a point a little to the rear of the seat, said levers forming extensions for supporting the main bow of the top, and said levers being provided with gearing at their pivoted ends for simultaneously swinging said levers and the main bow carried thereby forwardly and rearwardly to and between a substantially horizontal position at the rear of the seat to an upright position over the seat and above the heads of the occupants of the car.

A further object of this invention is to provide a main bow for the top pivoted to the body of the vehicle, as above described, and in turn provided with levers and linkages operable upon the movement of the main bow and its main operating levers to rotate or swing the front frame from a substantially horizontal position over the windshield through an angle of 180° to a horizontal position in the rear of the car and to reverse said operation upon the movement of the main bow and its supporting levers upwardly forwardly from its position in the rear of the car.

A further object of this invention is to provide a collapsible top for an automobile with a main bow to which the front frame and the rear bow are pivotally connected directly through linkages or levers so that the forward movement of the said main bow and its supporting levers unfolds the top and gradually positions the rigid parts of the top with respect to each other so that it is merely necessary to clamp the front frame to the windshield in order to completely enclose the car and, upon the rearward movement of the main bow and its supporting levers and the unclamping of the front frame with the windshield, the foldable material of the top is folded and the bows and front frame swing to a collapsible nested position in the rear of the car.

A further object of this invention is to provide a vehicle of the normally open type with the collapsible top wherein the main bow is provided with gearing for swinging it forwardly or rearwardly said gearing being easily operated from the driver's seat of the car by the turning of a conveniently positioned crank, said top being also provided with a substantial U-shaped front frame supported on two levers each end of which is independently pivoted on the support for the main bow, linked at their rear ends by a link extending substantially parallel to the main operating levers, one of said levers being pivotally connected to a link, the opposite end of which is pivoted to the body of the car at a fixed point and rearwardly of the pivot of the main operating levers, whereby the forward or rearward movement of the main bow carries the front frame with it forwardly or rearwardly and the levers and links operate to rotate the front frame through an angle of 180° from a horizontal position to an inverted horizontal position and vice versa.

A further object of my invention is to provide a collapsible top with a system of links and levers in which there are no locked positions or dead center positions at either the fully open or fully closed positions so that the top may be swung to open position, or from open position to closed or collapsed position by the mere turning of the crank of the operating mechanism, it being unnecessary to manually break a locked position in the framework or linkages in order to enable one to start to swing the top when it is in its open or closed position.

A further object of this invention is to support the front frame on the ends of two pairs of levers, each pair on a side of the car being pivoted to the main operating lever at different distances from the pivot of said main operating levers, the rear ends of said pair of levers being linked together by a link substantially parallel to the main operating lever and the rear end of one of said levers being also pivotally connected to a link also extending substantially parallel to said main operating lever, the free ends of said last-mentioned link being pivoted to a fixed point from the pivot of said main operating lever, whereby one lever of each of said pairs of levers which support the front frame moves in substantial parallelism horizontally during the major portion of their travel from collapsed toward open position, and the free ends of said levers move horizontally at different speeds during such motion, the free end of one of said levers being directly pivoted to the front frame and the forward end of the other of said levers being connected to said frame by a link the free ends of which are respectively connected to said lever and to said front frame.

Other objects of this invention will appear in the specification and claims below.

In the drawings forming a part of this specification and in which the same reference characters are used throughout the various views to designate the same parts, Fig. 1 is a side elevational view of a portion of a body of an automobile provided with a collapsible top embodying this invention, the top being shown in the main in longitudinal cross-section and in its raised position to the forward edge of the main front frame locked to upwardly directed studs at the top of the windshield frame, and which are in fact at the corners of the front frame;

Fig. 2 is a view similar to Fig. 1 showing the operative parts of the top in their relative positions with the top partly open;

Fig. 3 is a view similar to Figs. 1 and 2 but with the top further raised to show the relative movements of the front frame supporting and reversing levers;

Fig. 4 is a similar view of the operative parts of the top (the cover being omitted) showing the relative position of the parts after the main frame has passed just beyond a vertical position shown in Fig. 3;

Fig. 5 is a longitudinal sectional view through the car and through the top with the front frame and bows in a collapsed position at the rear of the car, the fabric covering being omitted as in Fig. 4 for the sake of clearness;

Fig. 6 is a plan view of one side of the top with the bows, linkages and levers in their collapsed position, as shown in Fig. 5.

In the drawings only so much of the body of the car is illustrated as is necessary to clearly show the manner in which this invention is mounted and operated. Thus the body 1 is shown as having a rear deck 2, a door 3 provided with a window 4 therein which may be raised and lowered from and into the door, and a windshield 5 which is provided with pins 6 extending upwardly therefrom for attachment and locking thereto of the top when raised, and as shown in Fig. 1. In the drawings the car is shown as provided with the usual shopping shelf 7 behind the back 8 of the seat, which includes the back-board or wall 9 and the rear of the car is provided with the usual bead or molding 10.

If the car be of the touring car type, with front and rear seats, then the space between the rear molding 10 and the back-board 9 of the front seat will be greater to provide for the second or rear seat of the car. The applicability of the invention to various styles of car bodies will be at once apparent if, however, the description herein be limited to its application to a car of the single seated roadster or sports type.

The near wall 11 extending above the bead 10 extends forwardly to form the side walls 12 and the top surface 12a of the side walls 12 are relatively wider or thicker particularly where they terminate at or adjacent the door.

It is within an opening 13 in the side walls 12 and below the flat top surface 12a thereof that the supports for the collapsible top are pivotally mounted as will be referred to again below.

The opening 13 in this flat surface 12a, need be merely wide enough within which to permit the mounting therein of the lower ends of the main bows, the bows and the connecting linkages as will more plainly appear below.

Referring now to Figs. 5 and 6, behind the backboard 9 and below the shopping deck or shelf 7 and accessible by lifting the closure 14 in the deck or shelf 7, is a housing 15 in which is mounted a transverse shaft 16 the ends of which pass through the inner wall of the side wall 12 of the vehicle and the said shaft carries within the openings 13, pinions 17 one at each end of the shaft 16 respectively. This shaft 16 is also preferably journaled in bearings 18 in the inner side of the wall 12 (see Fig. 6).

Within the housing 15 the shaft 16 is provided with a worm gear 19 meshing with the worm 20 rigidly mounted on an upright shaft 21 suitably journaled in the housing 13, said shaft 21 being provided at its upper end with a removable crank 22 above the shelf 7 and preferably a little to the rear of the backboard 9.

The pinions 17 on the ends of the shaft 16 are respectively in mesh with the teeth of gears or gear segments 23 mounted to turn on suitable studs 24 carried on lugs 25 on brackets or plates 26 forming the outer wall of the opening 13.

A pair of main operating levers 27, one on each side of the car are respectively secured to the gear segments 23 and extend upwardly therefrom. To the outer sides of these levers are rigidly secured the ends of the main bow 28. In this way the main operating levers 27 virtually form extensions or continuations of the ends of the main bow, being unitary therewith. These main operating levers 27 are operative to swing the main bow 28 on the stud 24 as a center from the forward position shown in Fig. 1 to the rearmost position shown in Fig. 5, and vice versa, by merely turning the crank 22 in one direction and then in the other respectively.

The collapsible top also includes the front frame 29 which in general is U-shaped and comprises the front bar 30 with rearwardly extending metal side plates 31 at the ends thereof rigidly secured by bolts or rivets to the side irons 32, the free ends 33 of which are preferably upturned slightly (when the top is in its raised position), as is clearly indicated in Fig. 1. The free upturned ends 33 of the front frame 29 are connected each by a pivot pin 34 with the forward end of rigid frame-supporting levers 35, in turn pivoted each on a pivot pin 36 carried by the main operating levers 27 respectively.

Also pivoted to the main operating levers 27, each on a pivot pin 37, is a second pair of front-frame supporting levers 38 each having pivotally mounted on a pivot pin 39 at its free end, a short link 40, the free end of which is in turn pivotally mounted on a pivot pin 41 rigidly mounted in a lug 42 extending upwardly from the top side of the side irons 32 and between the upturned end 33 and the side plate 31. From this lug 42 a rigid stud 43 projects laterally into the path of the movement of the short link 40 about its pivot pin 41. This pin or stud 43 is to the rear of the pivot pin 41 and is positioned a little higher than the pivot pin 41 when the front frame 29 is in the position shown in Fig. 1.

Thus it is that the front-frame 29 is pivotally supported on the two frame-supporting levers 35 and 38, the frame being directly pivoted to the forward free end of the lever 35 and indirectly pivotally supported on the free end of the frame supporting lever 38 through the short link 40.

The rear ends of the front frame-supporting levers 35 and 38 are respectively connected by the pivot pins 44 and 45 at the opposite ends of a link 46; which is substantially a paralleling connecting bar, although a line connecting the axes of the pivots 44 and 45 is not exactly parallel to a line connecting the axes of the pivot pins 36 and 39. It is, however, substantially parallel at all times with the main operating lever 27, as an inspection of Figs. 1, 2, 3 and 4 clearly shows.

The rear end of the upper lever 38 is also connected by a pivot pin 47 with the upper end of a main link 48, the lower end of which is pivotally mounted on a pivot pin 49, stationarily mounted within the slot or opening 13, below the axis of the shaft 16, to the rear thereof, and carried by the side plate 26 of the side wall 12.

Thus it is that the front frame 29 is supported at all times on the forward free ends of the front frame supporting levers 35 and 36, both of which are pivoted on the main operating levers 27; is directly pivoted to the levers 35 by the pivot pins 37, and is connected to the free ends of the supporting lever 38 by short links 40 to the ends of which the said levers 38 and the side irons 32 are pivoted on the pivot pins 39 and 41.

The rear bow 50 is provided with the bow irons 51 rigidly secured thereto in any convenient manner, said bow irons being pivotally attached to the main operating levers 27 respectively on pivot pins 52. The ends of the intermediate spreader or bow 53 are in turn pivotally mounted on the irons 51 respectively on the pivot pins 54.

Over the front frame 29 and around the sides thereof and over the main bow 28, and the intermediate bow 53 and the rear bow 50, and around the sides thereof tightly fits, when the top is raised, the flexible covering material 55 of the vehicle top, the rear edge 55ª being fixedly secured to the rear and side walls 11, 12 of the body of the car in the usual manner, and the front edge 55ᵇ being fixedly secured to the front bar 30 of the front frame 29. Along the sides of the front frame 29 and above the window 4, the side edges 55ᶜ of the covering material 55 substantially fit against and slightly overlap the edge of the frame of the window 4 following the shape of the rear edge of the window or door down to the point where it is secured to the side wall 12 adjacent the door 3. When the top is raised, one merely closes the door 3 and raises the window 4 to its top position in which position the edge 55ᶜ of the top material 55 overlaps the top of the door or window, thus preventing rain or snow from entering the car.

It will now be seen that the main front-frame 30, the rear bow 50 and the intermediate bow 53 are all connected with the main bow 28 through the main operating levers 27 rigidly secured to and forming a part of the main bow 28, so that when the main operating levers 27 and the main bow 28 carried thereby are moved forwardly or rearwardly on the pivotal studs 24 all the other parts of the top correspondingly move with them.

The effective length of the main operating levers 27 approximates that of the links 48 for the distance between the axes of the pivot pins 47 and 49 is substantially the same as the distance between the axes of the studs 24 and 39 so that the main levers 27 substantially form with the links 48, paralleling mechanism which hold the forward reach of the top frame levers 38 in substantially a horizontal position throughout the swing of the levers 27 from one extreme position to the other. The front supporting levers 35 are in a horizontal position only when the top is closed. This is because of the peculiar positioning of the pivot pins 36, 44, 45 and 37 as will be referred to again below. The said levers 35 and 38 always project forwardly from the main operating levers 27 and the main bow 28.

The main bow, the intermediate bow 53 and the rear bow 50 may be attached to the covering material 55 of the top by straps 56 stitched to the inside of the cover in any convenient manner, this attachment being operative to effect the lifting of the intermediate bow 53 and the rear bow 50 by the fabric material itself as it is pulled upwardly and forwardly by the front frame 29 and main bow 28.

The forward edge 30ª of the front bar 30 fits over the front upper edge 5ª of the windshield when the top is closed and the corners of the top bar 30 provided with metal fittings 57 providing sockets 58 in which the pins 6, projecting upwardly from the ends of the windshield, are clamped by wing bolts 59 when the top is in its raised position. In this position the free ends of the levers 35 are above or higher than the free end of the lever 38 as clearly shown in Fig. 1.

Referring now to Figs. 1, 2, 3 and 4, in which are shown four different positions of the top raising and lowering mechanism, it is to be observed that while the levers 37, the links 48 form substantially a paralleling mechanism so that as the main bow 28 is swung rearwardly, the forward part of the lever 38 remains substantially horizontal throughout the swing from the foremost position shown in Fig. 1 to the rearmost position, shown in Fig. 5; this is so of the levers 35 which are only horizontal in the collapsed folded position shown in Fig. 5.

The distance between the pivot pins 45 and 44 of the link 46 is slightly greater than the distance between the pivots 39, 36 and the distance between the pivots 45 and 39 is a little greater than the distance between the pivots 44 and 36, with the result that during the complete swing of the bow 28 from forward to rearward position, the levers 35 rotate anticlockwise on their pivots 36 a little faster than the levers 38 move clockwise with respect to their pivots 37 with the result that the free ends of the levers 35 swing from the position shown in Fig. 1 above the lever 38 to a horizontal position shown in Fig. 5 slightly below and parallel to the lever 38.

Starting then from the position shown in Fig. 1, when power is applied to the crank 22 to rotate the shaft 16 in an anticlockwise direction and consequently to swing the main operating levers 27 and the parts carried thereby in a clockwise direction around the stud 24, a very small first movement of the main bow 28 backwardly or rearwardly is operative to give a substantial movement in an anticlockwise direction to the lever 35 on the pivot 36 due to the short leverage at the rear end of the lever 35, as compared with the longer leverage at the rear end of the lever 38 and because the pivot 44 is in substantial alinement with the axes of the pins 39 and 36 (a dead center position) while the axis of the pin 45 is well above that dead center line. The free end then of the lever 35 moves then downwardly rather rapidly in the early rearward movement of the main operating levers 27 to a position below the horizontally extending portion of the lever 38 (see Fig. 2).

The rearward horizontal movement of the bar 38 is substantially more rapid than that of the bar 35 because its pivotal attachment of the lever 27 at 37 is more remote from the axis of rotation (the stud 24) than is the pivot 36 upon which the bar 35 is pivotally mounted on the same lever 27. This difference in motion is immediately observable in the short link 40, the lower end of which is pivotally attached to the bar or lever 38 and which is first rotated rearwardly or anticlockwise on its pivot 41 until it engages the rigid stud 43. This position is shown in Fig. 2.

As the main operating levers 27 now move from the position shown in Fig. 2 towards that shown in Fig. 3, the faster rearwardly horizontally moving upper lever 38 vertically drawing against the pin or stud 43, moves the stud 43 rearwardly faster than the pivot 34 moves horizontally thus effecting a clockwise rotation of the front frame on its pivot pins 34. It is to be noted that the link 40, as soon as it is drawn against the top frame 32, the stud 43, begins to rotate in a clockwise direction about its pivot 39. The free end of the lever 35 moves slowly in a clockwise direction downwardly about its center 36 and this movement continues until it reaches the position shown in Fig. 4. In Fig. 4, the front frame 29 is shown as having just passed its vertical position, from which point, due to the weight of the front frame, the short links 40, continue to rotate clockwise on their pivots 39 through a little more than 180° to the position shown in Fig. 5, wherein the pivot pin 41 is below the pivot pin 39. Briefly then the links 40 swing anticlockwise on their pivots 39 until the links abut against the stud 43 and thereafter clockwise on their pivots 39 in moving from the closed car position (Fig. 1) to the open position (Fig. 5).

It is also now plain that throughout this rearward movement, the forward reaches of the two levers 35 and 38 continually approach parallelism and that when they reach the position shown in Fig. 5 they are substantially parallel and horizontal.

The movement of the free ends of the levers 38 and 35 is also downwardly with respect to the main bow 28, toward the pivots 24 of the main bow so that when the horizontal position is reached the top frame 29 lies within the main bow 28 and substantially within the back bow 50, and the free ends of the levers 35 and 38 are relatively close to the pivot or stud 24, the pivot 34 being a little forward of the stud 24 and the pivot 39 a little in the rear of the stud 24, as shown in Fig. 5.

In throwing the top from the open to the closed position the reverse movement of the main levers effects a reversal of the motions above described. Swinging through the positions 4, 3 and 2, the front frame 29 turns through substantially 180° and finally reaches a position over the windshield 5 where it may be manually pulled down over the studs 6 and clamped thereto by the wing bolts 59.

Much importance attaches to the fact that there can be no dead locking of the parts in either full closed or full open position or in any intermediate position and this is due to the links 40. The free end of the lever 38 is perfectly free to move rearwardly horizontally and the end of the lever 34 is free to move downwardly as soon as motion is communicated to the levers 27 and the frame 29 is swung towards a vertical position by reason of the flexible connection between the ends of the lever 38 with the front frame 29 through the links 40. And so, in moving from the open position to the raised closed position, the lever 38 is free to move forwardly at once by the links 40 without having to be unlocked manually, before swinging the levers 27.

The top is automatically raised and lowered whenever either of the two parallelling members 27 and 48 are swung together forwardly or rearwardly respectively, irrespective of which of the two said members the power is directly applied. Thus when one of said members 27 or 48 is regarded as the power actuated lever, the other is the paralleling lever the operation of which is to maintain substantially horizontal at all times the forward reach of the lever 38.

While I have described and shown in the drawings any suitable mechanism for automatically swinging the said parallelling members on said respective pivots to automatically raise and lower the top, other means for accomplishing the same result are contemplated by me as being fully within the aim and scope of the present invention so long as they fall within the spirit and meaning of the appended claims.

Having thus described my invention, what I claim and desire to protect by Letters Patent of the United States is:

1. The combination with the body of a vehicle, of a collapsible top therefor comprising a pair of main operating levers respectively pivoted to the opposite sides of the body, means to swing said levers to an open top position and to a closed top position, each main operating lever being provided with a pair of front frame supporting levers pivoted to said main operating levers at different distances from the pivot of said main operating lever and projecting forwardly therefrom, a top frame, a short link pivotally attached to the side of said frame, the free end of the first of said levers being directly pivoted to said front frame, and the free end of the second frame supporting lever being directly pivoted to the free end of said link, a parallelling link pivotally attached at one end to said second frame supporting lever, and at its other end to said body, to maintain said lever substantially horizontal throughout the swing of said main operating lever between the limits of its movement, and a link connecting the rear ends of said frame supporting levers and operative to swing the free end of said first frame supporting lever from a point slightly above the level with the pivot of said second frame supporting lever when the top is closed, to a position in which said first frame supporting lever is substantially horizontal when said top is in open top position.

2. The combination with the body of a vehicle, of a collapsible top therefor comprising a pair of main operating levers respectively pivoted to the opposite sides of the body, means to swing said levers to an open top position and to a closed top position, each main operating lever being provided with a pair of front frame supporting levers pivoted to said main operating levers at different distances from the pivot of said main operating lever and projecting forwardly therefrom, a top frame, a short link pivotally attached to the side of said frame, the free end of the first of said levers being directly pivoted to said front frame, and the free end of the second frame supporting lever being directly pivoted to the free end of said link, a paralleling link pivotally attached at one end to said second frame supporting lever, and at its other end to said body, to maintain said lever substantially horizontal throughout the swing of said main operating lever between the limits of its movement, a link connecting the rear ends of said frame supporting levers and operative to swing the free end of said first frame supporting lever from a point slightly above the level with the pivot of said second frame supporting lever when the top is closed, to a position in which said first frame supporting lever is substantially horizontal when it is in open top position, and a stud rigid with said front frame and extending into the path of the movements of said link around its pivotal connection with said frame and against which said short link is drawn by the said second top supporting lever during the first of the movement of said main operating levers from closed top to open top position.

3. The combination with the body of a vehicle, of a collapsible top therefor comprising a pair of main operating levers respectively pivoted to the opposite sides of the body, means to swing said levers to an open top position and to a closed top position, each main operating lever being provided with a pair of front frame supporting levers pivoted to said main operating levers at different distances from the pivot of said main operating lever and projecting forwardly therefrom, a top frame, a short link pivotally attached to the side of said frame, the free end of the first of said levers being directly pivoted to said front frame, and the free end of the second frame supporting lever being directly pivoted to the free end of said link, a paralleling link pivotally attached at one end to said second frame supporting lever, and at its other end to said body, to maintain said lever substantially horizontal throughout the swing of said main operating lever between the limits of its movement, and a link connecting the rear ends of said frame supporting levers and operative to swing the free end of said first frame supporting lever from a point slightly above the level with the pivot of said second frame supporting lever when the top is closed, to a position in which said first frame supporting lever is substantially horizontal when it is in open top position, the pivotal points of said front frame supporting levers to said main operating levers being such that any movement of said second frame supporting levers about their pivotal points imparts to said first frame supporting levers a greater rotational movement than that of said first frame supporting levers, said greater movement being transmitted through said link connecting the rear ends of said levers, to completely invert said front frame during the travel of said main operating levers between the limits of their motion.

4. The combination with the body of a vehicle, of a collapsible top therefor comprising a pair of main operating levers respectively pivoted to the opposite sides of the body, means to swing said levers to an open top position and to a closed top position, each main operating lever being provided with a pair of front frame supporting levers pivoted to said main operating levers at different distances from the pivot of said main operating lever and projecting forwardly therefrom, a top frame, a short link pivotally attached to the side of said frame, the free end of the first of said levers being directly pivoted to said front frame, and the free end of the second frame supporting lever being directly pivoted to the free end of said link, a paralleling link pivotally attached at one end to said second frame supporting lever, and at its other end to said body, to maintain said lever substantially horizontal throughout the swing of said main operating lever between the limits of its movement, a link connecting the rear ends of said frame supporting levers and operative to swing the free end of said first frame supporting lever from a point slightly above the level with the pivot of said second frame supporting lever when the top is closed, to a position in which said first frame supporting lever is substantially horizontal when it is in open top position, and manually operable means geared to said main operating mechanism to swing the same to and from closed top and open top position.

HARRY D. HEUSER.